Figure 1:
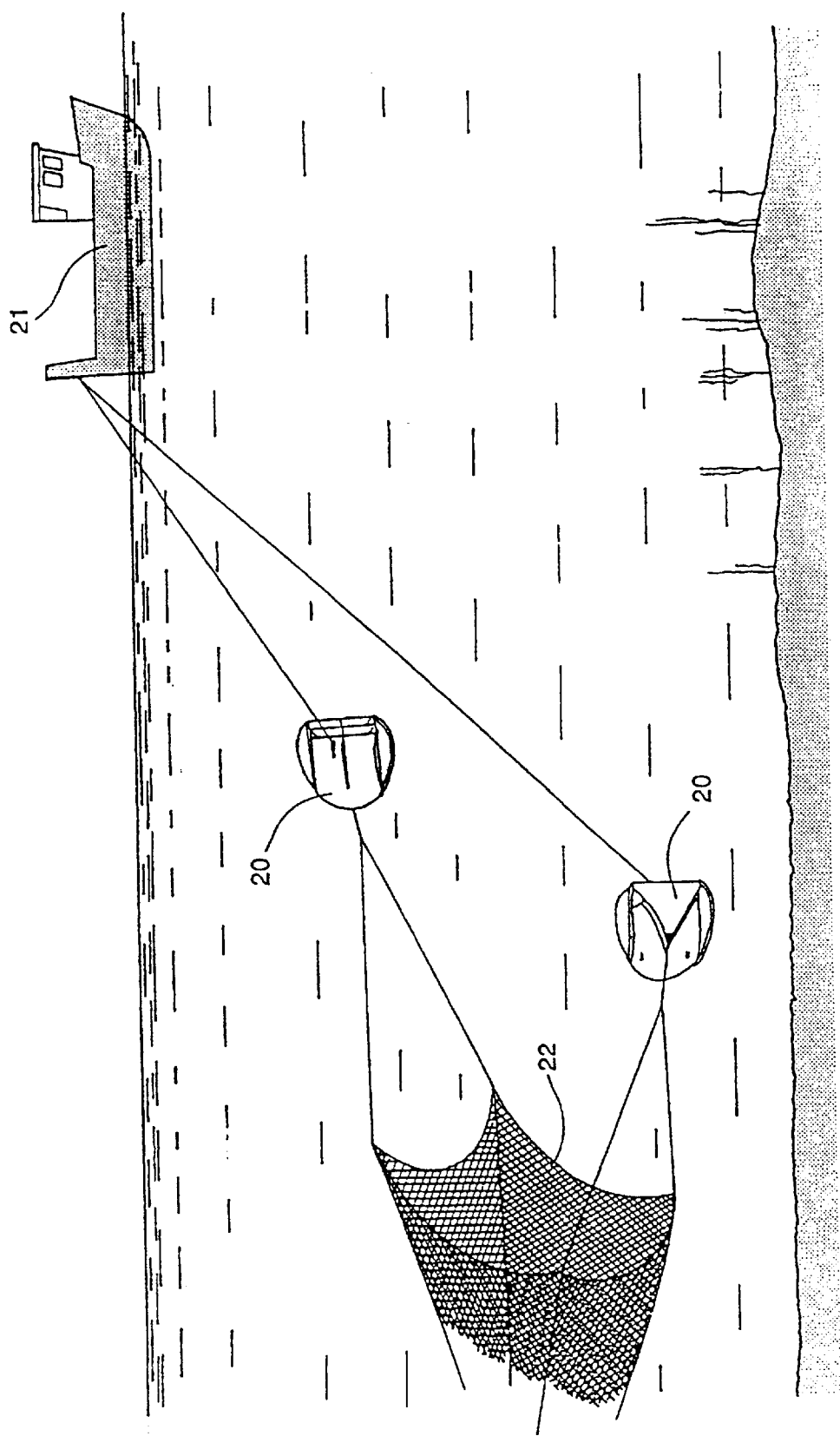

United States Patent [19]
Larsen

[11] Patent Number: 6,131,327
[45] Date of Patent: Oct. 17, 2000

[54] OTTER BOARD

[76] Inventor: Helgi Larsen, P.O. Box 116, FO-900 Vagur, Faroe Islands, Denmark

[21] Appl. No.: 09/171,667

[22] PCT Filed: Apr. 30, 1997

[86] PCT No.: PCT/DK97/00196

§ 371 Date: Nov. 9, 1998

§ 102(e) Date: Nov. 9, 1998

[87] PCT Pub. No.: WO97/40665

PCT Pub. Date: Nov. 6, 1997

[30] Foreign Application Priority Data

Apr. 30, 1996 [DK] Denmark .................................. 0514/96

[51] Int. Cl.[7] .................................................. A01K 73/045
[52] U.S. Cl. .................................................................. 43/9.7
[58] Field of Search ............................... 43/7, 8, 9.1, 9.7, 43/43.13

[56] References Cited

U.S. PATENT DOCUMENTS

| | | | |
|---|---|---|---|
| 3,308,568 | 3/1967 | Luketa | 43/9.7 |
| 4,640,037 | 2/1987 | Ashworth | 43/9.7 |
| 4,653,213 | 3/1987 | May | 43/9.7 |
| 4,879,830 | 11/1989 | Quick | 43/9.7 |
| 5,265,367 | 11/1993 | Kinoshita | 43/9.7 |
| 5,267,408 | 12/1993 | Kinoshita | 43/9.7 |
| 5,283,972 | 2/1994 | Kinoshita | 43/9.7 |

FOREIGN PATENT DOCUMENTS

| | | | |
|---|---|---|---|
| 1072850 | 2/1984 | U.S.S.R. | 43/9.7 |
| 2115661 | 9/1983 | United Kingdom . | |
| 2129661 | 5/1984 | United Kingdom | 43/9.7 |
| 2161351 | 1/1986 | United Kingdom | 43/9.7 |
| 2174881 | 11/1986 | United Kingdom . | |
| WO 98/24685 | 6/1998 | WIPO . | |
| WO 98/25162 | 6/1998 | WIPO . | |

*Primary Examiner*—Michael J. Carone
*Assistant Examiner*—Darren W. Ark
*Attorney, Agent, or Firm*—William J. Sapone, Esq.; Nims, Howes, Collison, Hansen & Lackert

[57] ABSTRACT

The invention relates to an otter board (20) which may be used for generating a spreading force in connection with trawl fishing. The otter board according to the invention comprises at least two foils (1–3) which are suspended between a number of longitudinally extending ribs (5, 6, 10, 17, 26, 27) in such a way that at least one tapered channel is formed in which the flow of water is passing through the otter board. The channels are curved and formed so that water is ejected at a high speed in relation to the towing speed in a direction slightly downwards and along a respective end section of an adjacent lower or intermediate foil extending from the outlets of the channels, whereby turbulence is prevented from occurring even at high angles of attack of the otter board.

12 Claims, 10 Drawing Sheets

OTTER BOARD

BACKGROUND OF THE INVENTION

The present invention relates to an otter board.

Otter boards are especially used for expanding a trawl, whereby two symmetrical otter boards are connected to respective side portions of a trawl, and whereby the otter boards are connected between the trawling vessel and the trawl by means of cables.

Such an otter board is known from GB-A-2 161 351 and comprises a number of transversly mounted elongate hydrofoil means, whereby each hydrofoil means comprises either one blade or a pair of blades, and whereby the hydrofoil means are spaced apart and distributed longitudinally in the direction of the water flow in a mounting frame comprising two straight, elongate mounting members being parallel to one another. The respective hydrofoils or each pair of hydrofoils are arranged in such a way that the cords are offset in relation to the mounting frame and in such a way that the offset angles are larger for a leading hydrofoil means compared to a trailing hydrofoil means.

In one embodiment, where the hydrofoils are arranged in pairs, each hydrofoil means comprises an overlapping upper or leading blade and a narrower lower or trailing blade, thereby forming channels or slots between each pair of foils.

The document GB-A-2 161 351 shows an embodiment having five pairs of hydrofoils being arranged in the mounting frame.

On the underside of the otter board there is provided a bracket having a number of fixture points for the attachment of cables to the trawler and on the mounting frame there is provided attachment points for the trawl. By means of these fixture points the function of the otter board, including the angle of attack of the board, can be adjusted.

The above board is both suited for operation near the sea-bottom and in mid-waters.

Prior art document DE-A-0 562 243 shows an otter board comprising a number of transversly mounted, elongate hydrofoils being longitudinally spaced apart in a mounting frame, and being arranged in such a way that the trailing edge of a hydrofoil and the leading edge of a neighbouring hydrofoil is situated next to each other. The hydrofoils are arranged in such a way that a leading hydrofoil is more offset to the frame than a trailing hydrofoil, and so that the plurality of hydrofoils, from a side view, altogether describe a shape like a wing profile.

OBJECTS OF THE INVENTION

The lateral directed force or lift force, which is generated by means of the otter boards mentioned above, is accomplished by means of the force generated by a curved hydrofoil profile, when exposed to a passing flow of water, whereby under-pressure or vacuum appears at the top side of the curved hydrofoil and over-pressure is generated on the underside of the hydrofoil, analogous with the forces generated by an aeroplane wingfoil, wherein the velocity of flow of air is higher and the pressure lower on the top side than on the underside of the airfoil.

As it is known in the field of airfoils, when the angle of attack for a foil is increased the under-pressure on the top side and the pressure on the underside of the foil increase. The surface friction or the drag, however, increases abruptly at a certain higher, critical angle of attack where the flow alters from being laminar to being turbulent. At this point the drag coefficient increases sharply.

Normally, otter-boards are angled even higher than the above mentioned critical angle for maximizing the pressure on the underside of the board during operation. Thus, attempts have been made in the prior art to improve the dynamics of otter boards in terms of spreading efficiency, drag and stability for high angles of attack. However, it is found that these qualities have still not been fully achieved in the prior art.

Therefore, it is a primary object of the present invention to increase the effective area of under-pressure or vacuum for an otter board construction of a given size without increasing the surface friction over a broad range of angles of attack of the otter board.

It is a secondary object of the present invention to provide an otter board which offers improved operational qualities, such as high hydrodynamic efficiency in terms of high spreading power and low drag, thereby reducing power consumption, and which also minimizes weight and bulk of the otter board, whereby handling of the otter board, including hauling it on board, can be fascilitated. Furthermore, it is an object to provide an otter board which is stable and which is not inclined to wobble under a wide range of trawling speeds as well as during initial and final manoeuvering of the trawl. It is also an object that the otter board should not be inclined to turn over, thereby avoiding cables to get tangled. It is a further object that the otter board is durable and shows good resistance to seabed impact and wear and tear.

The above objects have been achieved to a very satisfactory level by the invention.

According to the invention, the injection principle is utilized by means of one or more channels formed between the foils, the channels being tapered in the direction of flow, whereby, according to Bernoullis' equation [area 1 * speed 1=area 2 * speed 2; where 1 and 2 denotes a cross section at the beginning and at the end of the channel respectively], the speed of the water at the end of the channel is rendered higher than at the entrance to the channel or compared to the towing speed. This increase in speed is followed by a pressure decrease at the orifice of the rear end of the channel. The high velocity flow of water ejected from the channel or channels, which is directed along and slightly down on the end section of a channel, due to the curvature of the channel or channels, effectively hinders turbulence from occurring around the foils and specifically at the end section of the foils, even for high angles of attack of the otter board.

It is also believed that the relatively high speed of water flow which is ejected from the channel or channels bring about a certain steering effect which makes the board more stable and prevents it from wobbling.

Tests have shown that for the otter boards according to the invention laminar flow is ensured over a broad range of angles of attack ranging from 5° up to 45°.

According to the invention, outlets for the channels are arranged such that water is partly flowing rearwards partly sideways in relation to the otter board as seen from a position above the board. Thereby, an area of under-pressure is produceded centrally on the otter board, as seen from above, so that the stability of the otter board is not adversely affected.

By using overlapping foils according to the invention, it is achieved that a large, effective under-pressure area can be obtained and thereby a high total spreading force can be generated for a relatively compact otter board.

Improved steering properties and seabed functionality of the otter board of the present invention is accomplished by means of a fin which is arranged along a first outermost situated rib of the otter board and a keel flanking the fin on the opposite rib.

The rounded design of the keel, the rear edge and the fin, whereby sharp corners between these parts are obviated, ensures that the otter board is not prone to getting caught in sea floor objects and that the cabling for connecting to the ship and the trawl, or other objects for that matter, will not get entangled in the otter board. Additionally, a low drag coefficient of the board is accomplished.

An alternative, more fully rounded design has also been achieved.

According to the invention, a mounting means for attaching the board to the trawl is placed on the top side of the board in extension of a central rib. This position of the mounting means is advantageous because under-pressure is occurring around the central part of the board, seen from above. Thereby, the required structural strength of the foils and the ribs, and hence the weight of the otter board can be minimized. Many other advantages will be evident from the following description in which special reference is made to the accompanying drawing.

THE DRAWING

Figure 2:
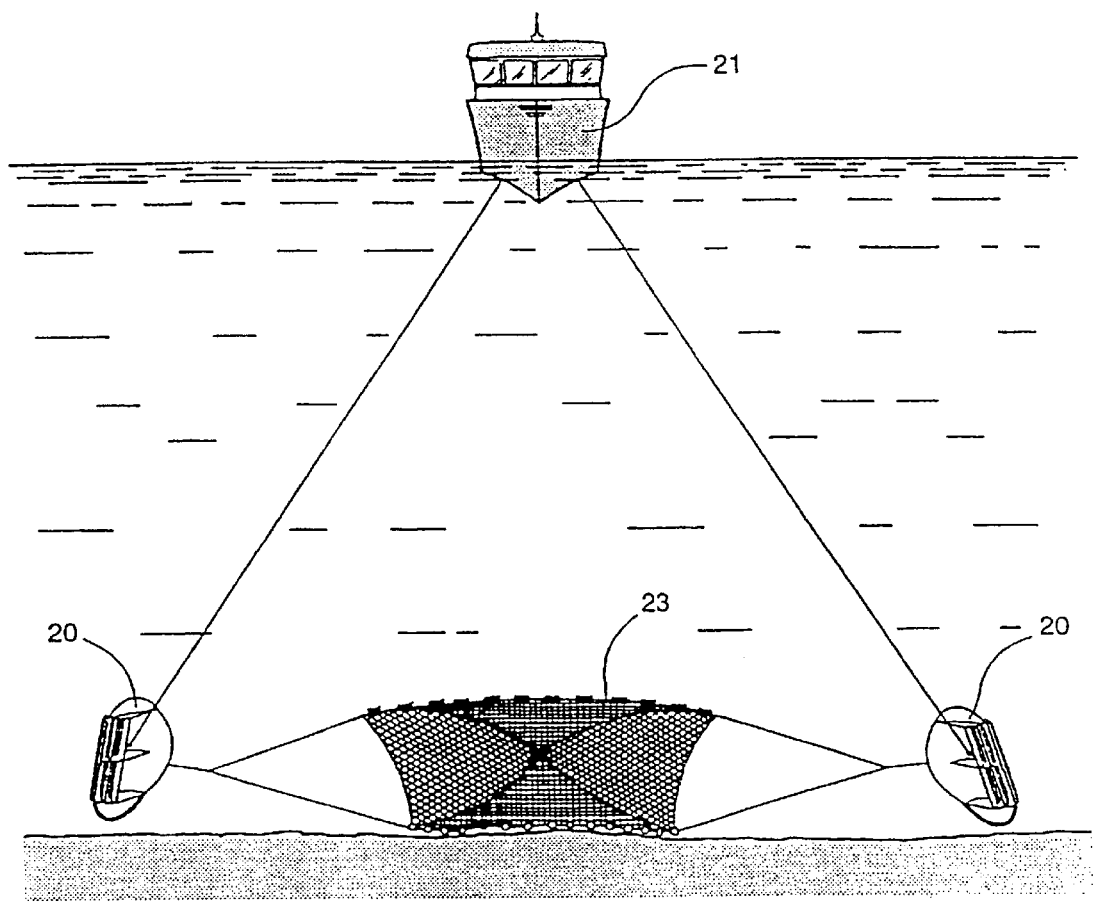
Figure 3A:
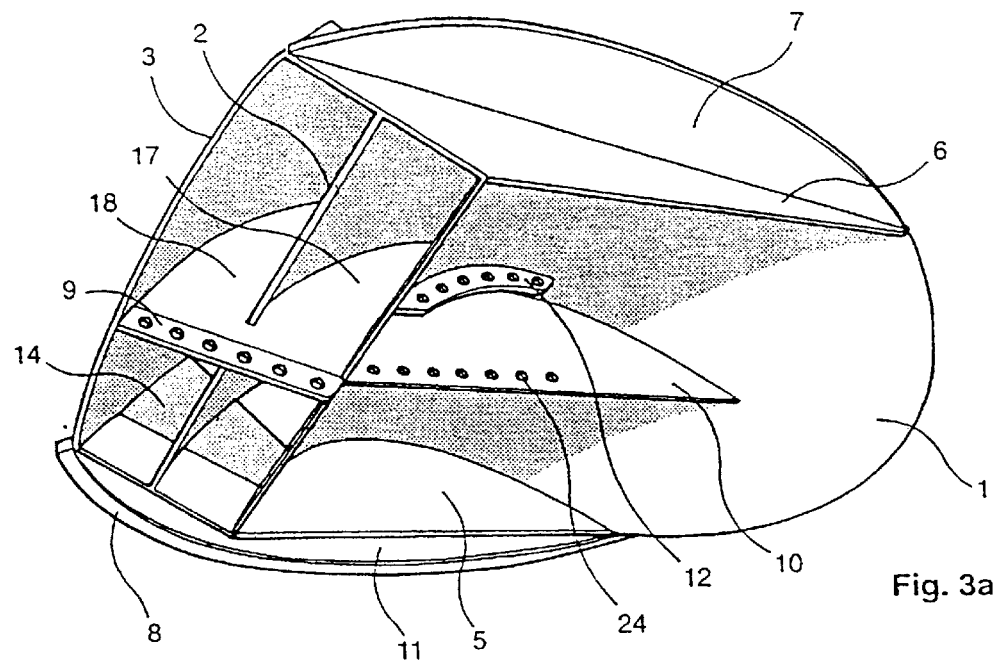
Figure 3B:
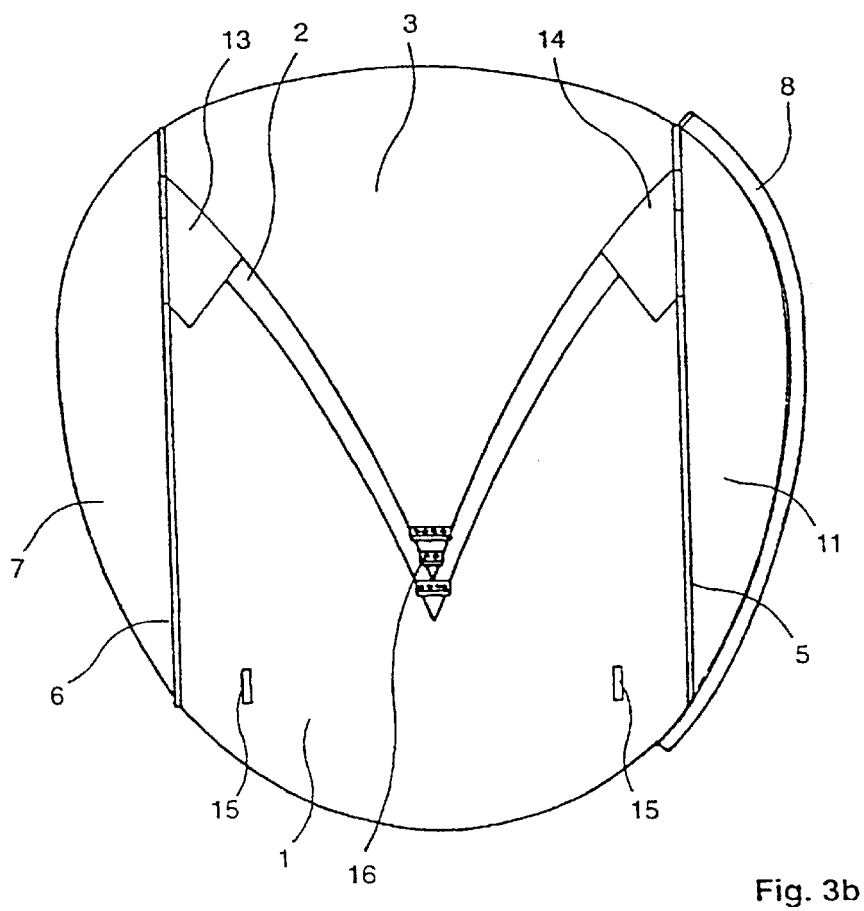
Figure 3C:
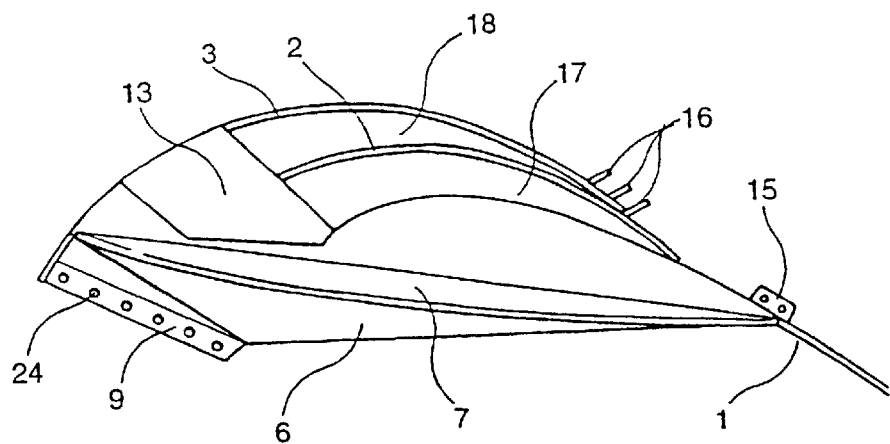
Figure 4A:
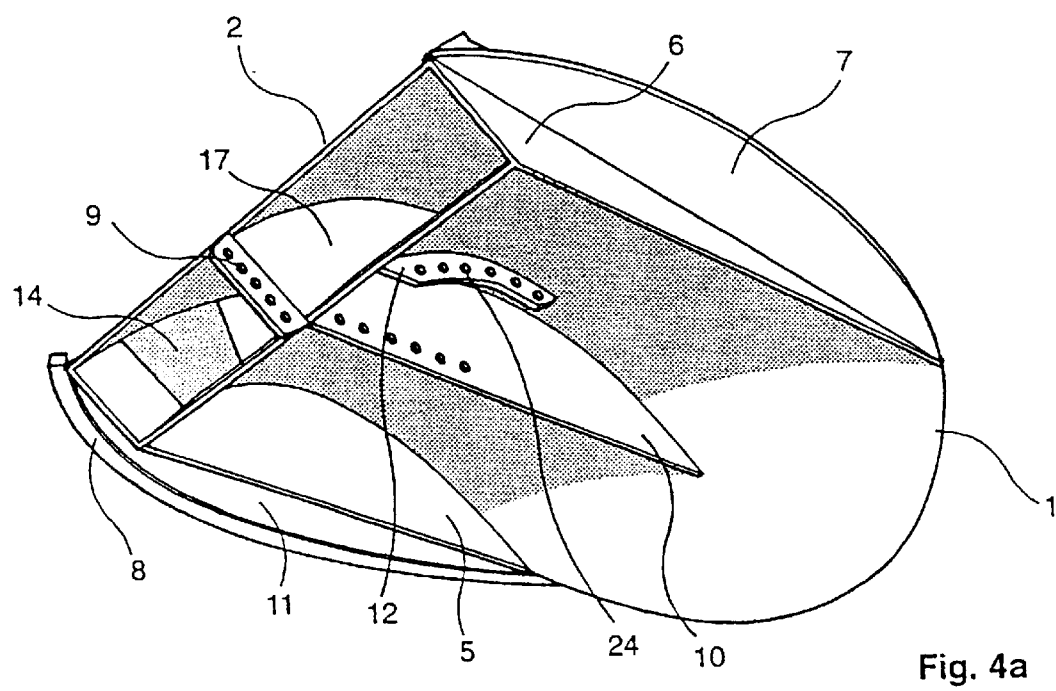
Figure 4B:
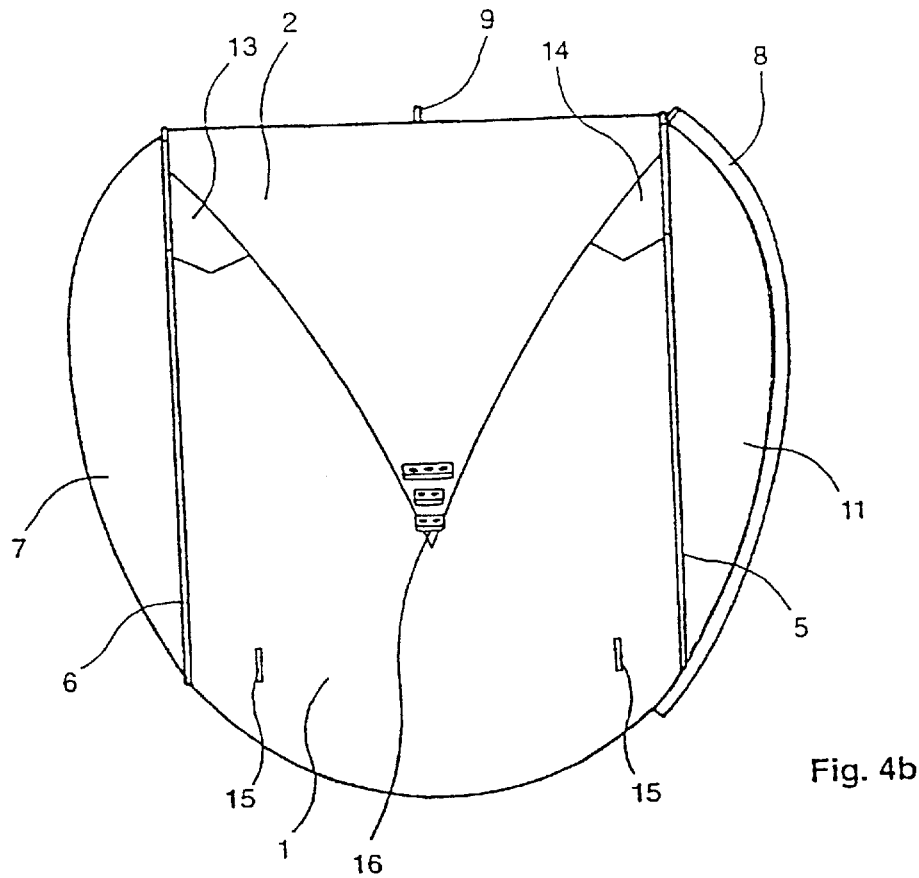
Figure 4C:
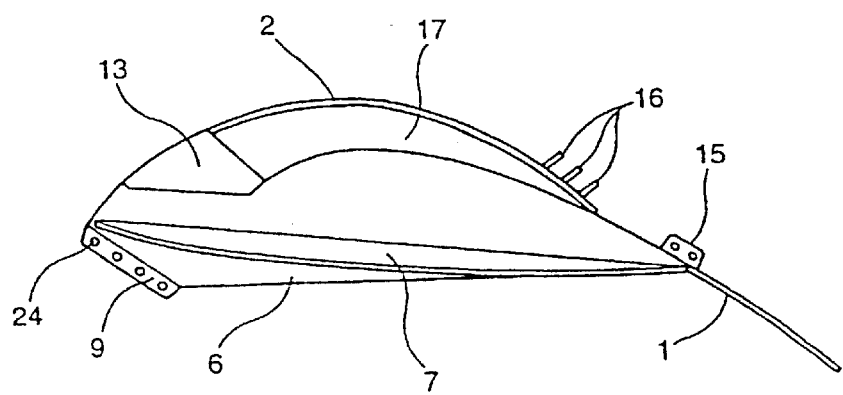
Figure 5A:
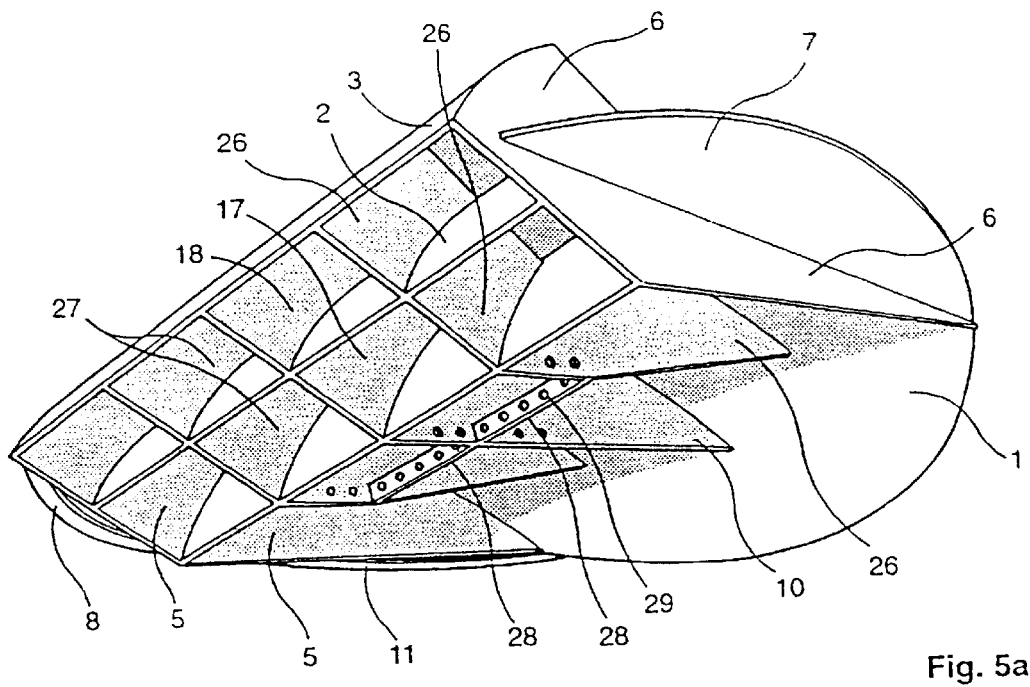
Figure 5B:
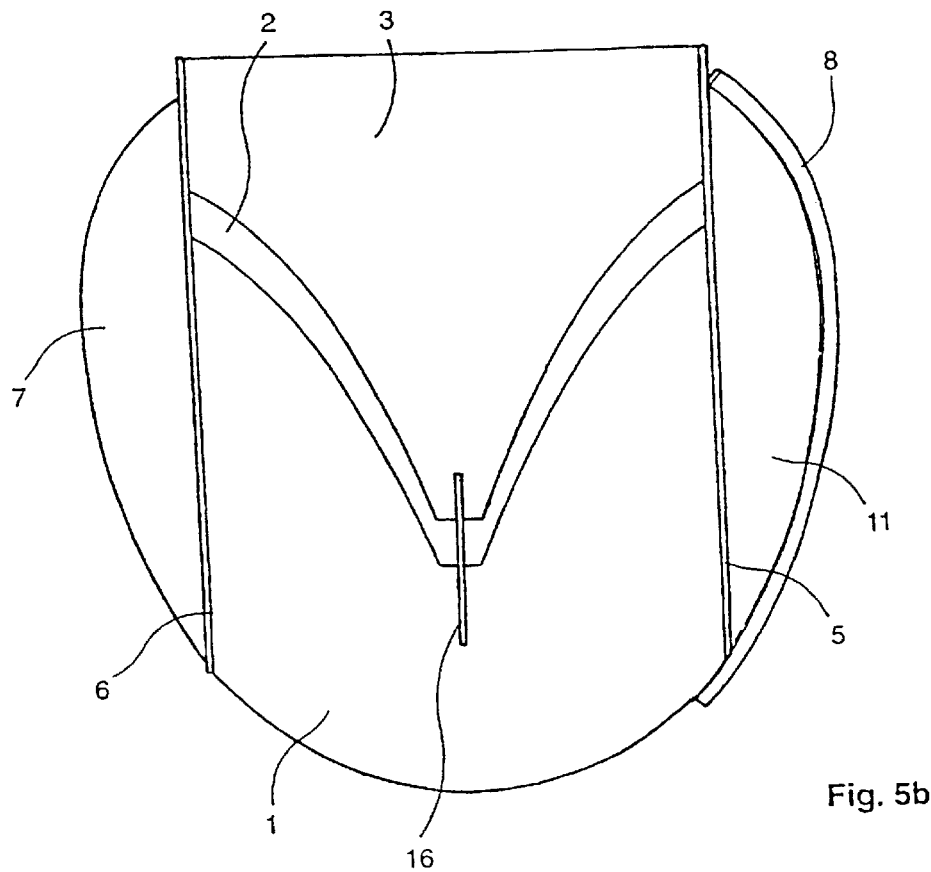
Figure 5C:
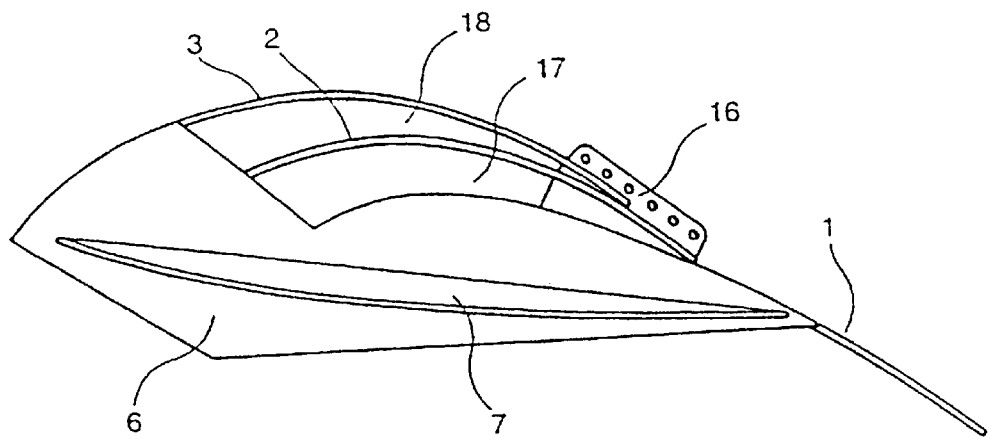
Figure 5D:
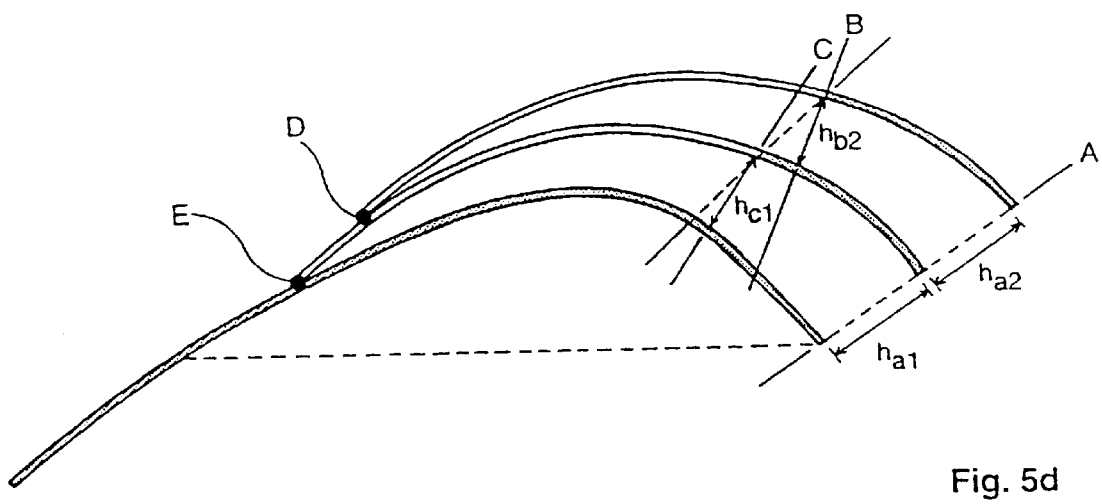
Figure 6:
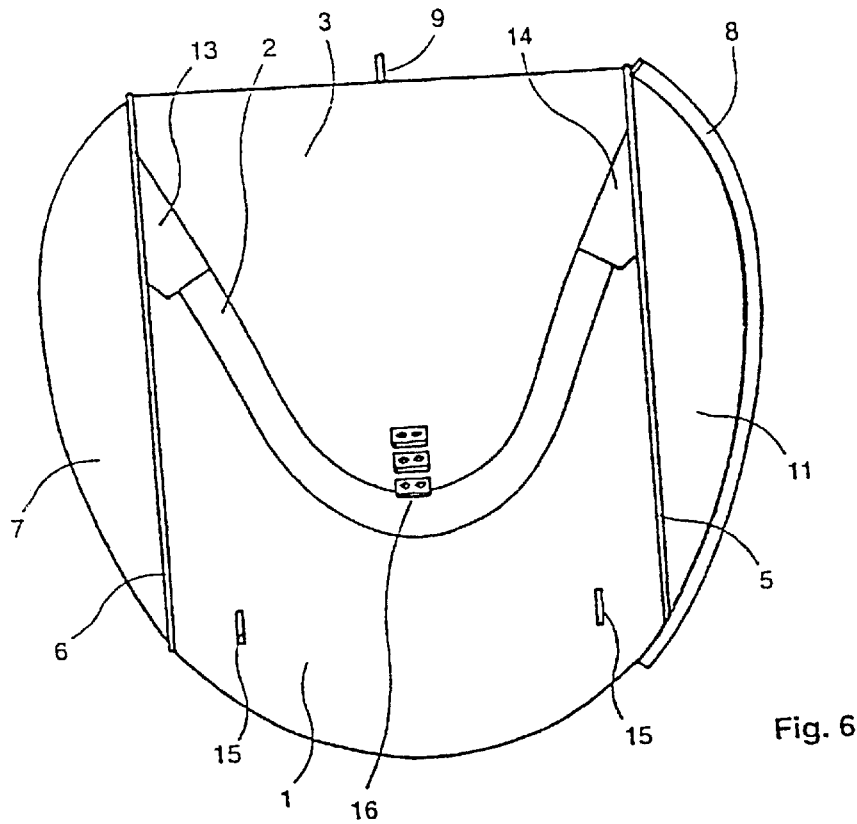
Figure 7:
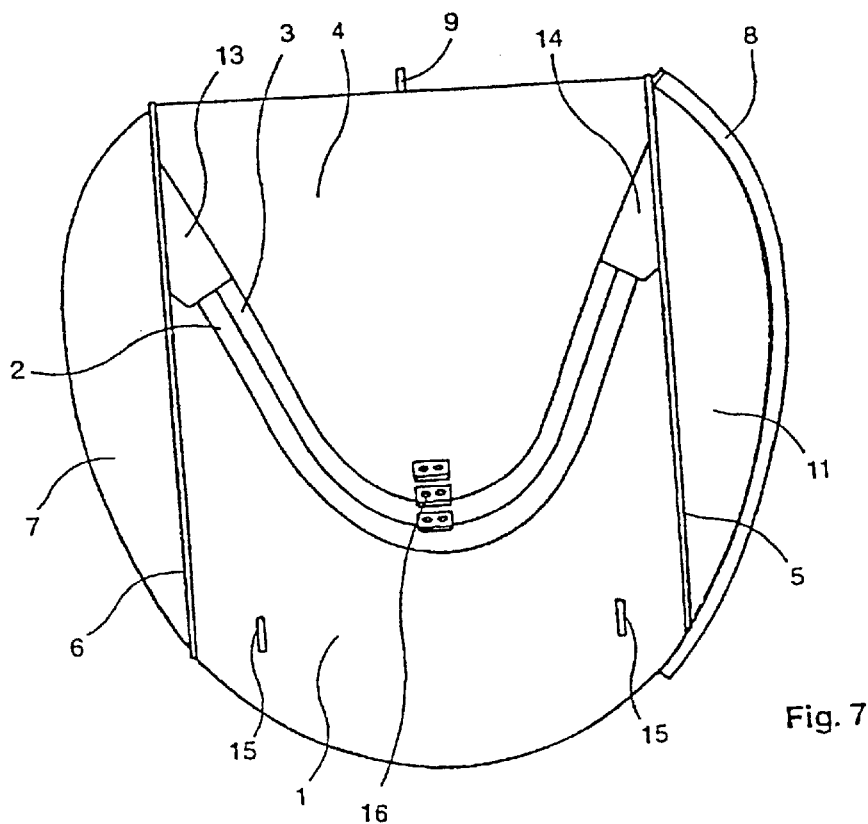
Figure 8:
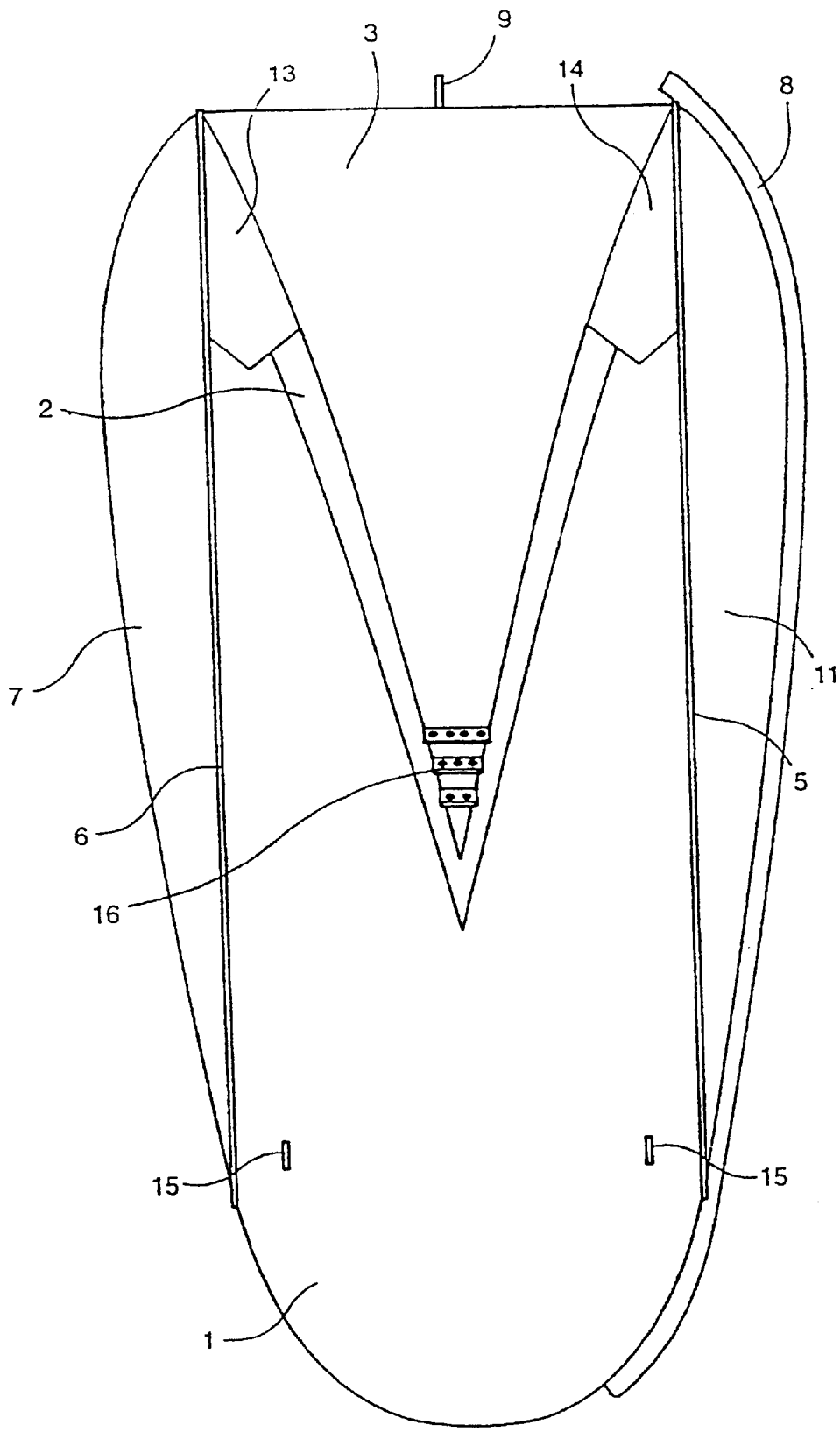
Figure 9:
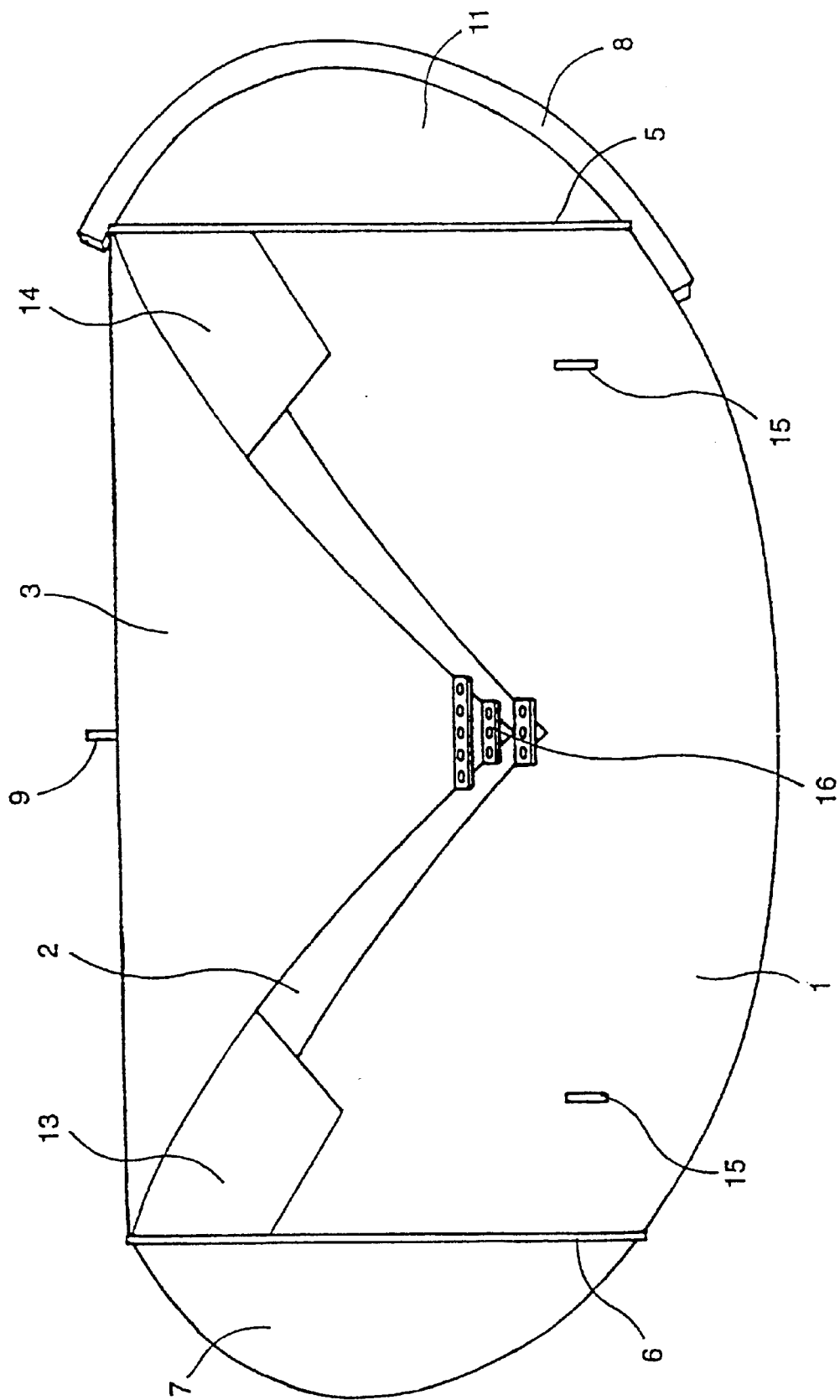

FIG. 1 shows two otter boards according to an embodiment of the invention in operation, FIG. 2 shows an embodiment of the invention in operation from another view compared to FIG. 1, FIG. 3a shows a first embodiment of the otter board according to the invention, FIG. 3b shows a top view of the first embodiment in FIG. 3a, FIG. 3c shows a side view of the first embodiment, FIG. 4a shows a second embodiment of the otter board according to the invention, FIG. 4b shows a top view of the second embodiment, FIG. 4c shows a side view of the second embodiment of the invention, FIG. 5a shows a third embodiment of the invention, FIG. 5b shows a top view of the third embodiment, FIG. 5c shows a side view of the third embodiment, FIG. 5d shows a side view of the foils of the third embodiment, FIG. 6 shows a top view of a fourth embodiment, FIG. 7 shows a top view of a fifth embodiment, FIG. 8 shows a top view of a sixth embodiment, FIG. 9 shows a top view of a seventh embodiment.

DESCRIPTION

In FIG. 1 and FIG. 2 two symmetrical otter boards 20 according to the invention are shown in operation for positioning and spreading a trawl 22, 23. The otter boards are coupled to cables between a towing vessel 21 and a trawl 22, 23. In FIG. 1 a trawl 22 is shown for mid-water trawling, and in FIG. 2 another trawl 23 is shown in operation close to the seabed.

FIGS. 3a–3c show a first embodiment of the otter board according to the invention. The otter board comprises a lower foil 1, an intermediate foil 2 and an upper foil 3, the foils being arranged above and relatively close to one another by means of two parallelly extending outer ribs 5 and 6, and by means of a lower centre rib 10 and a number of intermediate centre ribs 17 and 18. The foils 1–3 are preferably symmetrical about a centre line.

As illustrated in FIG. 3b, at least the rear sections of each intermediate foil 2 and upper foil 3 of the otter board describe a substantially triangular outline seen from above, and both foils extend from a position above the lower foils covering these as seen from above, and continues to a position at about the centre of the lower foil 1, also seen from above, in such a way that the rear point of the triangular upper foil is placed at this centre. The lower foil 1 extends out below the upper foils 2 and 3 and forms an end section.

Seen in profile, the foils 1–3 are curved and arranged in such a way that the cords of the lower foil and the upper foil are offset to the cords of the upper foil, seen from the centre line of the otter board, and in such a manner that the channels which are formed between the foils and the ribs taper in the direction of flow.

In the embodiment shown in FIGS. 3a–3c the ribs 17, 18 and the foils 1–3 form four channels through which water streams, but more ribs, and hence more channels, can be provided in order to enhance the stiffening of the foils and the strength of the board.

In the embodiment according to FIGS. 3a–3c the upper foil 3 of the otter board has been rounded such that it extends a bit over the intermediate and lower foil in order to improve the durability of the board. As it has been shown in the following embodiments, this feature can be omitted optionally.

According to the first embodiment of the invention shown in FIGS. 3a–3c and the embodiments according to FIGS. 6–9 a pair of side plates 13 and 14 are arranged at side portions of the upper foils 2 and 3 in order to lead to a further tapering of the channels. Thereby, the angle of attack can be rendered higher due to the velocity increase of the flow in the channels without turbulence occurring.

As seen in FIGS. 4a–4c a minimum of two foils and three ribs can be utilized, thereby forming only two channels. This version of the invention is of course more economical to produce, although the spreading force is not as high compared to the embodiments having more foils.

Due to the curvature of the foils, under-pressure will occur at the top side of each foil when a flow of water is passing by at a sufficiently high speed, and a lift force or spreading force is generated.

As described in the introduction, the tapered profile of the channels generates an increase in the velocity of flow at the end of the channel, thereby increasing the speed of water streaming out of the channels by a factor typically between 2 and 3. Furthermore, the foils are designed in such a way that the end sections of the channels cause water to be ejected in a direction slightly downwards towards and along the lower foils. This prevents turbulence from occurring, even in case of exceptional high angles of attack.

In FIGS. 5a–5d a third embodiment of the invention has been shown. In many ways it is similar to the embodiments described above, but no side plates have been provided. The stability of this version is a little lower, but the spreading force is higher compared to the embodiments using side plates.

The foils, according to the embodiment corresponding to FIGS. 5a–5c at a section adjacent to the outer rib 5 or 6, are illustrated in profile on FIG. 5d, whereby line A, which is perpendicular to the lower, intermediate and upper foils relates to the inlets of the upper and lower channels. The distances $h_{a1}$ and $h_{a2}$ denote the channel height at the respective inlets on line A. Line B and the height $h_{b2}$ denote the distance between the intermediate and the upper foils and line C and the distance $h_{c1}$ denote the distance between the lower and the intermediate foils. The height, $h_{b2}$ or $h_{c1}$, constitutes about ¾ of the height, $h_{a2}$ or $h_{a1}$, of the inlet of the respective channels. In this embodiment the channels' height decrease to about ¾ at a position, which, measured from the front edge of the respective inlets inside a respective channel corresponds to approximately 1.35 times the height of the the respective inlets.

Modifications of this tapering is deemed to be necessary if foil parameters are changed, for instance if the curvature of the foils is altered.

As seen in FIG. 5d the upper and intermediate foils meet the adjacent lower or intermediate foil in points or areas D and E, which points or areas are positioned on a centre line of the otter board, as seen from above.

At the point D the upper foil is approaching the intermediate foil at an angle preferably between 5–15°, and at the point E the intermediate foil is also approaching the the lower foil preferably at an angle between 5–15°.

In the embodiment according to FIGS. 6 and 7 a modification of the shape of the rear edges of the upper or intermediate foils has been shown. The rear edges describe a rounded section which is symmetrical to the centre line of the otter board, wherein the rear edge extends from a central lower point to the two forward corners of the board in oblique angles to the centre line.

At one side of the otter board a keel 11 is arranged along the outermost rib 5, whereby the keel comprises a wearing section 8. The keel 11 allows the otter board to be in contact with and glide over the seabed and to overcome natural obstacles without turning over.

On the opposite side of the keel there is provided a fin 7 extending along and protruding from the outermost placed rib 6.

The fin 7 and the keel 8 give the board the directional steering properties which make the otter board operate in the upward position shown in FIGS. 1 and 2.

The fin 7, the keel 8 and the rear edge of the foil 1 describe a generally round outline which is advantageous from the point of view of reducing turbulence around the junctions between the various elements, thereby reducing drag. Furthermore, the board is less inclined to getting entangled with objects on the seabed or with the cables to the towing vessel or the trawl, perhaps even damaging these, compared to a board having more sharp edges.

For all the embodiments according to the invention a first mounting means is provided in the form of attachment holes 24 on a rib 9 or the rib 10 provided at the underside of the lower foil 1 at the centre line of the otter board.

In the embodiment according to FIGS. 3a and 4a there is also provided an auxiliary first mounting means 12 parallel to the attachment holes 24.

These mounting means serve as points of attachment of the cable to the vessel, whereby the angle of attack of the otter board can be adjusted according to the position where the cable is hinged to the mounting means in order to adapt the board to the actual load.

An alternative auxiliary first mounting means 12 is shown in the embodiment in FIG. 5a, wherein a laterally oriented bar 28 having various points of attachment 29 is provided.

For all the embodiments a second mounting means 16 is provided on top of the upper foils 2 and 3 for attachment to the trawl. Also this mounting means allows for an adjustment of the attachment point.

Optionally, an auxiliary second mounting means 15 may be provided on the rear section of the foil 1 so as to distribute the pulling forces from the trawl more evenly.

Although the scale of the otter board is not limited in any way, the weight of an otter board according to the invention typically ranges between 2–5 tons, and may be eveneven higher. Such a board is subject to and generates very large forces, and for the largest of these boards additional strengthening of the foils is neccesary.

For this purpose two stiffening ribs 26, 27 are inserted between the central and the outer ribs in the embodiment according to FIGS. 5a–5d, but even more stiffening elements may be provided between the foils in order to enhance the structural strength of the board. In order to enhance the torsional stiffness the stiffening means could be arranged at various angles deviating from right angles to the foils, as seen from a position ahead of the otter board.

It can be advantageous to provide a sort of grille or net at the inlet to the channels in order to prevent larger objects, such as stones, to get jammed in the inlet, thereby preventing a deformation of the otter board.

FIGS. 8 and 9 show two variants of the otter-board for which the width to length ratio is about 1:3 and 3:1, respectively. The otter board according to FIG. 8 will offer maximum spreading force, but does not provide optimum stability. The board according to FIG. 9, on the other hand, is more stable, although the lift effect is comparatively smaller. The latter board could for instance be adapted especially for seabed operation.

The otter board is adapted for being connected between an object such as a trawl and a towing vessel for exerting a lateral force to the object relative to the direction of the towing force. The otter board has a lower foil and an upper foil and possibly a number of intermediate foils and at least two substantially parallelly-oriented and longitudinally extending ribs. The foils curve in the direction the otter board moves through the water and form at least one channel between them. For each channel, the lower or intermediate foil forms an end section which extends in a longitudinal direction behind the rear edge of the upper or intermediate foil in each channel. At least one channel tapers in the direction of water flow, whereby water flowing through the channel is changing direction and is ejected at a relatively high speed slightly down towards and along the top side of the respective end section of the intermediate and/or lower foils.

Such an otter board may be characterized in that at least two channel outlets are provided which are symmetrical to one another about a center line of the otter board and extend in the direction of flow seen from above the board. The outlets point rearwards and sideways such that water flows rearwards and sideways in relation to the direction of flow of water entering the otter board seen from a position above the otter board.

The otter board may have a channel height that has been reduced to about ¾ at a distance inside the channel from the front edge thereof, the distance corresponding to the inlet height multiplied by approximately 1.35. The leading edge of an upper or intermediate foil may be placed ahead of the leading edge of the adjacent lower or intermediate foil seen from a direction perpendicular to the direction the board moves in the water.

The otter board may have foils that are symmetrical about a central axis when seen from above the otter board, and in that a center portion of a rear edge near the center axis of the intermediate or upper foils is closer to the adjacent lower or intermediate foil compared to the two side portions on each side of the center portion of the rear edge of the upper or intermediate foil. The center portion of the rear edge of one intermediate or upper foil may extend to a position from a front edge thereof corresponding to about 50–80% of the length of the otter board as seen from above. The rear edges of the upper or intermediate foils may substantially have the shape of a triangle seen from a position above the otter board. The rear edges of the upper or intermediate foils may be rounded as seen from a position above the otter board. The rear edge of the lower foil may be rounded as seen from a position above the otter board.

A steering fin may be provided on an outermost rib of the otter board and a keel at the outermost rib opposite the steering fin. The keel may be provided with a wearing section. The keel and the fin may describe curved sections seen from above the otter board, whereby the curve defined by the rounded rear edge of the lower foil continues smoothly in the keel and the fin.

The upper foil may describe a rounded curve as seen from above, and the keel and the fin describe curved sections also seen from above the otter board, whereby the curve defined by the rounded rear edge of the lower foil and the rounded front edge of the upper foil continues smoothly in the keel and the fin.

The otter board may further include a first mounting means for connecting to the towed object, provided on the top side of the otter board, above and preferably in extension of a central rib and near the central rear edges of the upper or intermediate foils. A second mounting means may be arranged at the underside of the otter board. A length to width ratio of the otter board may be within 1:3 to 3:1.

The otter board may have at least three foils forming at least two channels, wherein at the center line of the otter board the upper or intermediate foil approaches an adjacent intermediate or lower foil at a angle of preferably between 5 and 15° at points where the respective foils meet. Two side plates may be arranged close to the front edges of the foils arranged in oblique angles in relation to the center line of the otter board for accomplishing further tapering of the channels formed between the foils.

The special features mentioned in connection with the embodiments described above are not meant specifically and only to illustrate these, but may be interchanged with one another in order to adapt the otter board according to the invention to certain applications.

What is claimed is:

1. An otter board for connecting a trawl to a towing vessel comprising:

a lower foil, an upper foil and at least two substantially parallel longitudinal ribs which arrange the upper foil above the lower foil, the upper foil having a rear edge, the upper foil and lower foil being symmetrical about a central axis, extending generally along a length of the otter board, the upper foil and lower foil having opposed surfaces, each foil being curved and forming at least one channel therebetween, the lower foil having an end section which extends in a longitudinal direction from the rear edge of the upper foil, a center portion of the rear edge being closer to the lower foil than portions on opposite ends of the rear edge of the upper foil, the channel having a taper in a direction of water flowing through the channel such that a speed of the water exiting the channel is higher than a speed at an entrance to the channel, the water passing therethrough being directed down to and along a top side of the end section of the lower foil.

2. The otter board of claim 1 further comprising an additional substantially parallel longitudinal rib located along a center line of the otter board, for defining two channels having two outlets.

3. The otter board of claim 2 further comprising first mounting means for connecting the trawl to a top side of the otter board located above the additional substantially parallel longitudinal rib and near the central portion of the rear edge of the upper foil.

4. The otter board of claim 1 wherein the upper foil has a leading edge, the lower foil has a leading edge, the upper foil leading edge located forward of the lower foil leading edge.

5. The otter board of claim 1 wherein the center portion of the rear edge of the upper portion is located at a position that is between about 50 to 80% of the length of the otter board.

6. The otter board of claim 1 wherein the upper foil has a substantially triangular shape, the center portion of the rear edge being a rear point of the substantially triangular shape.

7. The otter board of claim 1 further comprising a steering fin provided outwardly on one of the at least two substantially parallel longitudinal ribs and a keel provided outwardly on another of the at least two substantially parallel longitudinal ribs.

8. The otter board of claim 7 further comprising a wearing section provided on the keel.

9. The otter board of claim 7 wherein the keel and the steering fin each have a curved outer edge, a rear edge of the lower foil having a curved shape which mates with the curved outer edges of the keel and the steering fin.

10. The otter board of claim 1 further comprising first mounting means for connecting the trawl to a top side of the otter board.

11. The otter board of claim 1 further comprising mounting means located on an underside of the otter board.

12. The otter board of claim 1 further comprising a pair of side plates, each located along a side of a forward portion of the upper foil and each arranged at an oblique angle relative to the center axis of the otter board, the side plates tapering the channel.

* * * * *